May 30, 1944. P. LIM 2,350,050
VEHICLE
Filed Aug. 16, 1940 2 Sheets-Sheet 1
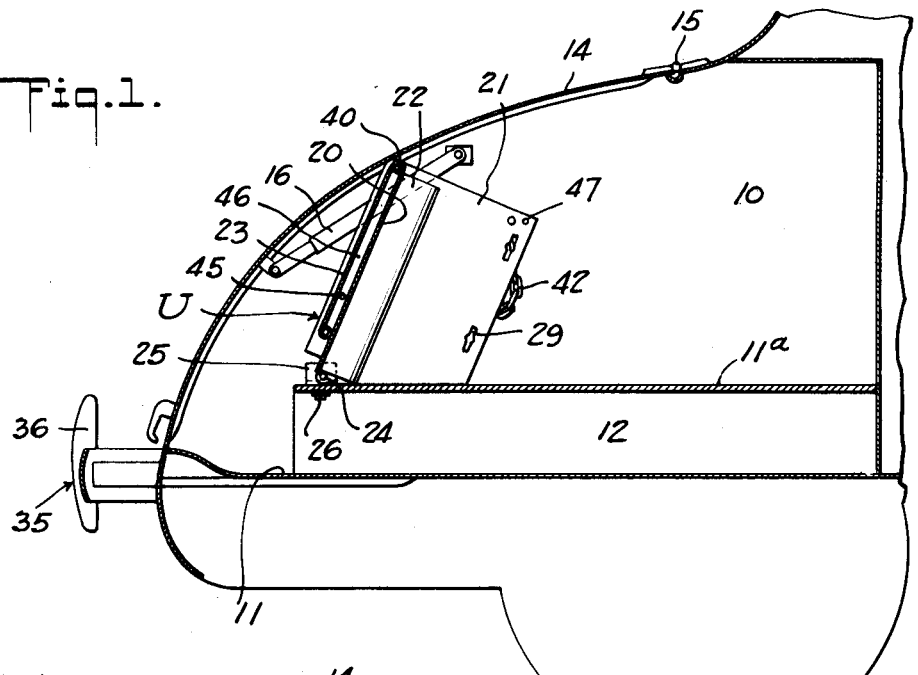
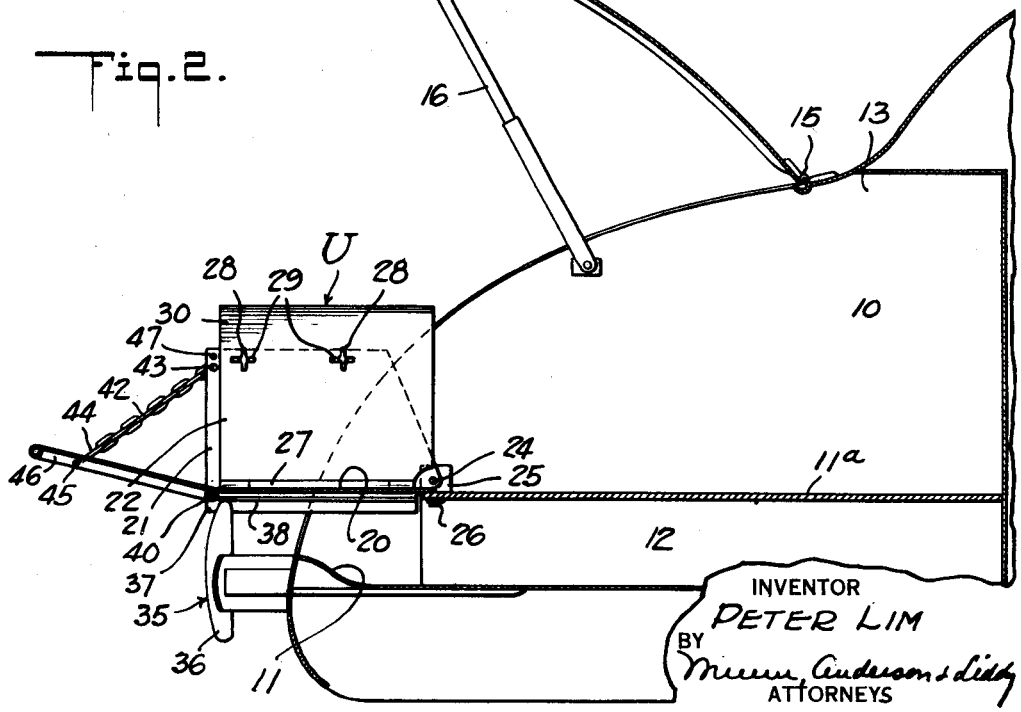
INVENTOR
PETER LIM
ATTORNEYS May 30, 1944.   P. LIM   2,350,050
VEHICLE
Filed Aug. 16, 1940   2 Sheets-Sheet 2

INVENTOR
PETER LIM
BY
ATTORNEYS

Patented May 30, 1944

2,350,050

UNITED STATES PATENT OFFICE 2,350,050

VEHICLE

Peter Lim, Los Angeles, Calif.

Application August 16, 1940, Serial No. 352,920

2 Claims. (Cl. 296—26)

This invention relates generally to vehicles, and more particularly to bodies for automobiles.

An object of the invention is to provide a vehicle body embodying a storage unit which, in its association with the usual storage space at the rear of the body, enables the capacity of such storage space to be greatly increased to conveniently transport relatively heavy and/or bulky loads, whereby to eliminate the expense involved in utilizing a truck or other commercial vehicle for this purpose, all without detracting from the normal appearance of a pleasure automobile and the utilization of its storage space when the storage unit is not in use.

Another object of this invention is to provide a storage unit of the above described character which is pivotally mounted in the storage space of the vehicle body to occupy an active position wherein the unit projects rearwardly from the storage space to form a continuation thereof, or an inactive position wherein the unit can be concealed in the storage space by the closure therefor, yet will not prevent the use of the storage space.

A further object of the invention is to provide a storage unit for vehicle bodies which, in one of its adaptations, utilizes the rear bumper structure of the vehicle as a means of support for the unit when in its active position, whereby to greatly strengthen the unit without involving the expense of additional supporting structure for this purpose.

A further object of the invention is to provide a storage unit which can be readily incorporated in the structure of an automobile body during its manufacture or can be easily installed as an accessory without the necessity of modifying the structure of the body.

With these and other objects in view, the invention resides in the combinations, arrangements and functional relationships of elements as set forth in the following specification and particularly pointed out in the appended claims.

In the accompanying drawings,

Figure 1 is a fragmentary vertical longitudinal sectional view of the rear portion of a pleasure automobile body with one form of storage unit embodying this invention applied to the body and occupying its inactive position;

Figure 2 is a view similar to Figure 1 and showing the storage unit in its active position;

Figure 3:
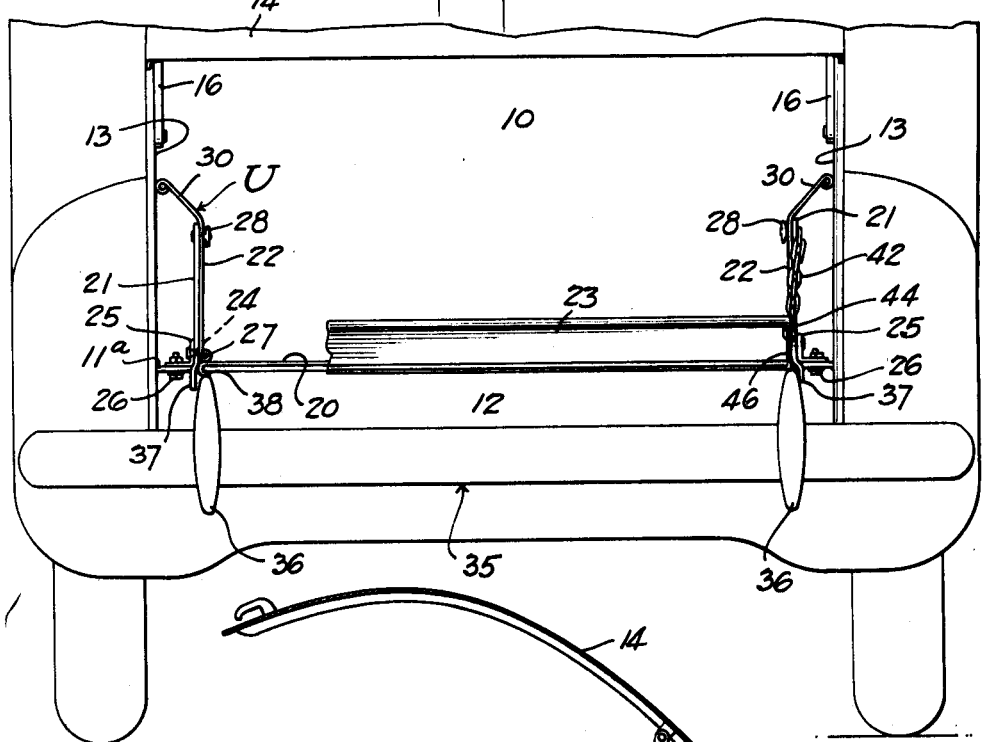
Figure 3 is a view in rear elevation partly broken away, of the automobile body and storage unit shown in the preceding figures.

Referring specifically to the drawings, and particularly to Figures 1 to 3, inclusive, the invention is shown associated with a pleasure automobile the body of which can be of any type having at the rear thereof a storage space 10 defined by a bottom wall 11 stepped upwardly adjacent the rear end of the storage space, as indicated by 11a, to provide a well 12 for a spare tire, open at the rear for access to the tire. Side walls 13 rise from the bottom wall 11 and curve downwardly and rearwardly of the body. A lid 14 corresponding in curvature to that of the upper edges of the side walls 13 is hinged at its forward end at 15 on the side walls to occupy either a raised or lowered position to accordingly open or close the storage space, the lid being retained in its raised position by a suitable latching brace 16, all of which will be clearly understood by those familiar with the art.

The storage unit embodying this invention and designated generally at U, is preferably of sheet metal construction and is composed of a rectangular bottom panel 20, rigid side panels 21 rising from the bottom panel, auxiliary side panels 22 and a rear panel 23, this structure being pivotally mounted on pins 24 projecting from angle brackets 25 secured by bolts 26 to the stepped up portion 11a of the bottom wall 11 adjacent the rear end of such portion, whereby to mount the storage unit in the storage space for movement about a fixed axis horizontally and transversely disposed, to occupy the inactive position shown in Figure 1 or the active position shown in Figure 2.

The auxiliary side panels 22 are hinged to the bottom panel 20 at the juncture of the latter with the rigid side panels 21, as indicated at 27, for adjustment from a position wherein the auxiliary side panels rest flat upon the bottom panel, to a position flat against the inner sides of the side panels 21. Suitable rotary latches 28 are mounted on the side panels 21 and are adapted in one position of rotary adjustment to be extended through slots 29 in the auxiliary side panels 22.

Upon turning the latches 28 through an angular distance of ninety degrees, the auxiliary side panels 22 will be latched to the side panels 21 and will extend the height of the latter sufficiently to close a gap between the forward end of the side panels 21 and the side walls 13. The upper portions of the panels 22 above the panels 21 flare outwardly at 30 and having rolled upper edges to effectively reinforce such panels.

In its working position the bottom panel 20 of the storage unit U forms a flat rearward continuation of the bottom wall 11a, and the side panels 21 and 22 form rearward continuations of the side walls 13, whereby to materially enlarge the capacity of the storage space 10. In the working position of the unit, its bottom panel 21 overlies the conventional rear bumper structure 35 of the vehicle and co-acts with such structure to effectively support the overhanging portion of the storage unit U and any load which it may contain. In the specific type of vehicle body illustrated in Figures 1 to 3, inclusive, the bumper guards 36 co-act with subtending portions 37 of the side panels 21 and with inturned portions 38 of the bottom panel 20 to directly support the unit and to confine the latter against displacement transversely of the vehicle body.

The rear panel 23 is hinged at 40 to the rear edge of the bottom panel 20 so as to function as a tail gate, and is supportable in open position by chains 42 anchored at 43 to the side panels 21 and having hooks 44 adapted to be hooked into openings 45 in end flanges 46 of the rear panel 23. The rear panel can be secured in a fully raised position closing the rear of the storage unit by utilizing the hooks 44 which latter are hooked through the openings 45 and through registering openings 47 in the side panels 21.

When released from the hooks 44 the rear panel 23 can be swung about its hinge 40 to rest flat against the under surface of the bottom panel 20 in the inactive position of the storage unit shown in Figure 1 so that the unit will offer only a negligible obstruction to any load which it is desired to carry in the storage space when the lid 14 is closed to obtain the normal appearance of a pleasure vehicle.

In this position of the storage unit it will be clear that its auxiliary side panels 22 are unlatched from the rigid side panels 21 and are swung about the hinges 27 to rest against the upper side of the bottom panel 20, and that the rear portion of a load in the storage space in advance of the unit can be disposed between the rigid side panels 21, which latter thus do not interfere with the load. Practically, the entire normal capacity of the storage space 10 can, therefore, be utilized without interference by the unit U when in its inactive position. Furthermore, with the storage unit in its active position, its co-action with the bumper structure or equivalent extraneous support on the vehicle will insure that the unit will be extremely rigid to safely transport relatively large and/or bulky loads within the carrying capacity of the vehicle thus enlarged by the unit.

Figure 4:
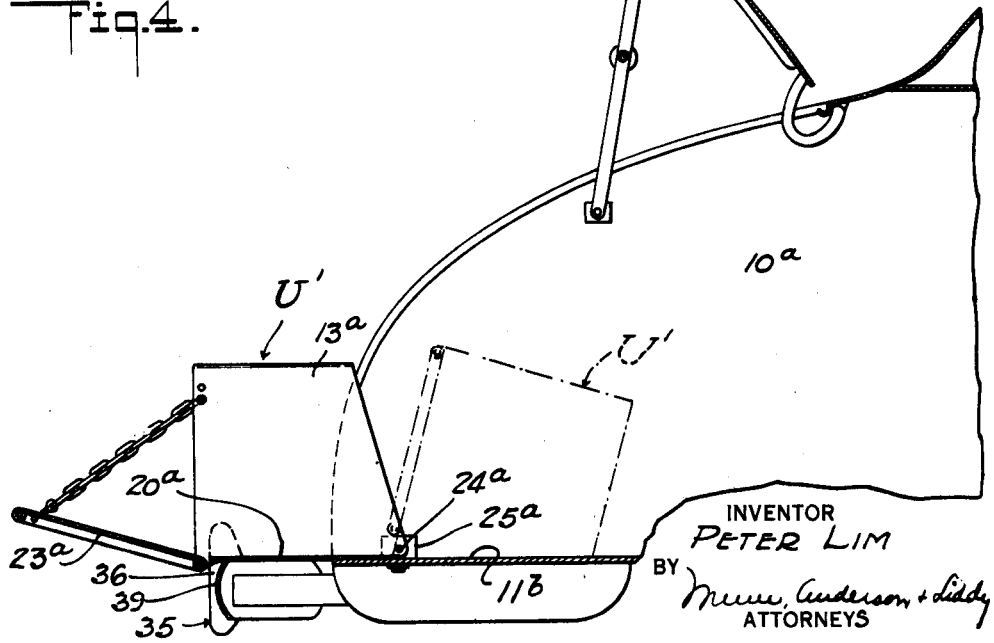
Figure 4 is a view similar to Figure 2 and showing a modified form of storage unit applied to a vehicle body of slightly different construction than that illustrated in Figure 2.

Reference will now be had to Figure 4, which illustrates a modified form of storage unit U' which is similar in construction to the unit U except for the omission of the auxiliary side panels 22, which latter in the slightly different construction of vehicle body shown in these figures, can be dispensed with.

In this particular type of vehicle body, its storage space 10a is defined by a substantially flat bottom wall 11b which does not include the spare tire well 12, as the spare tire is carried elsewhere on the vehicle.

The side panels 13a of the unit U' pivotally mount the unit by means of pins 24a on brackets 25a, from the bottom wall 11b, for movement to occupy the same positions and to function in the same manner as the unit U. the hinged rear panel 23a of the unit also functioning as a tail gate in the same manner as the panel 23.

However, due to the absence of the tire well 12, the bottom panel 20a of the unit U' rests directly on the bumper bar 39 of the bumper structure 35 so as to form a substantially flush rearward continuation of the bottom wall 11b, it being understood that the bumper guards 36 are spaced apart sufficient to receive the width of the storage unit therebetween. As the functioning and advantages of the unit U' are otherwise identical to the unit U, further detailed description is deemed unnecessary.

However, it will be manifest that irrespective of the type of vehicle body to which the storage unit is applied, the storage space of the vehicle can be greatly increased without in any manner sacrificing the design and beauty of the body of a pleasure automobile, and that when the storage unit occupies its inactive position and is concealed in the storage space by the lid thereof, interference with the normal carrying capacity of the storage space will be negligible so as not to detract from the utility of the storage space.

What is claimed is:

1. In a vehicle, a vehicle body having an exteriorly streamlined storage space opening to the top and to the rear thereof; a streamlined lid pivotally mounted at its forward end on the body to swing downwardly and rearwardly to close the storage space; an open-topped storage unit composed of a bottom panel, side panels and a rear panel; means mounting said unit in the storage space at the lower forward corner portion of the unit for pivotal movement independently of the lid about a fixed horizontal axis extending transversely of the vehicle body; said axis being disposed for the storage unit to occupy a working position wherein it projects beyond the rear of the storage space to form rearward extensions of the sides and bottom of the latter, or an inactive position entirely within the storage space, wherein the open top of the unit faces forwardly of the storage space and the rear of the unit is uppermost; and means pivotally mounting said rear panel of the storage unit at the rear lower corner thereof to close the rear of the storage unit or function as a tail gate thereof when the unit is in working position, or to be disposed substantially flatly against said bottom panel when the unit occupies its inactive position, whereby to enable a load in the storage space to project between the side panels and above the latter without interference by the rear panel.

2. In a vehicle, a vehicle body having an exteriorly streamlined storage space opening to the top and to the rear thereof; a streamlined lid pivotally mounted at its forward end on the body to swing downwardly and rearwardly to close the storage space; an open-topped storage unit composed of a bottom panel, side panels and a rear panel; means mounting said unit in the storage space at the bottom forward portion of the unit for pivotal movement independently of the lid, about a fixed horizontal axis extending transversely of the vehicle body; said axis being spaced a sufficient distance from the rear end of the storage space for said unit to occupy a working position wherein it projects beyond the rear end of the storage space to form rearward extensions of the sides and bottom of the latter when said lid is raised, or an inactive position entirely within the storage space when closed by said lid, and wherein the unit rests on the bottom of the storage space with the open top of the unit facing forwardly of the storage space and the rear end of the unit uppermost.

PETER LIM.